(12) United States Patent
Pawar et al.

(10) Patent No.: US 9,311,333 B1
(45) Date of Patent: Apr. 12, 2016

(54) MANAGING FILES OF FILE SYSTEMS

(71) Applicant: EMC Corporation, Hopkinton, MA (US)

(72) Inventors: Sitaram Pawar, Shrewsbury, MA (US); Philippe Armangau, Acton, MA (US); Jean-Pierre Bono, Westborough, MA (US); Christopher Seibel, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 458 days.

(21) Appl. No.: 13/730,086

(22) Filed: Dec. 28, 2012

(51) Int. Cl.
*G06F 17/30* (2006.01)

(52) U.S. Cl.
CPC .............................. *G06F 17/30227* (2013.01)

(58) Field of Classification Search
USPC .................. 707/608, 640, 687, 705, 758, 790
See application file for complete search history.

(56) References Cited

U.S. PATENT DOCUMENTS

| | | | | |
|---|---|---|---|---|
| 7,689,599 B1* | 3/2010 | Shah et al. | | 714/19 |
| 8,161,235 B2* | 4/2012 | Fukuguchi | | 711/113 |
| 8,161,236 B1* | 4/2012 | Noveck et al. | | 711/113 |
| 2008/0098041 A1* | 4/2008 | Chidambaran et al. | | 707/201 |
| 2010/0180153 A1* | 7/2010 | Jernigan et al. | | 714/6 |

* cited by examiner

*Primary Examiner* — Sana Al Hashemi
(74) *Attorney, Agent, or Firm* — Krishnendu Gupta; Jason A. Reyes; Deepika Bhayana

(57) ABSTRACT

A method is used in managing files of file systems. A group transaction record for an indirect data block of a file of a file system is created. The indirect data block of the file includes a set of data blocks of the file. A set of transaction entries is added to the group transaction record. Each transaction entry of the set of transaction entries includes information regarding an operation performed on a data block of the set of data blocks. The group transaction record is stored in a journal. The journal includes metadata transactions upon a plurality of files of a plurality of file systems.

20 Claims, 10 Drawing Sheets

MANAGING FILES OF FILE SYSTEMS

CROSS REFERENCE TO RELATED APPLICATIONS

This application is related to co-pending U.S. patent application Ser. No. 13/730,307 entitled MANAGING DELETION IN FILES OF FILE SYSTEMS filed on Dec. 28, 2012, and U.S. patent application Ser. No. 13/730,409 entitled MANAGING DELETE OPERATIONS IN FILES OF FILE SYSTEMS filed on Dec. 28, 2012, which is incorporated herein by reference.

BACKGROUND

1. Technical Field

This application relates to managing files of file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

SUMMARY OF THE INVENTION

A method is used in managing files of file systems. A group transaction record for an indirect data block of a file of a file system is created. The indirect data block of the file includes a set of data blocks of the file. A set of transaction entries is added to the group transaction record. Each transaction entry of the set of transaction entries includes information regarding an operation performed on a data block of the set of data blocks. The group transaction record is stored in a journal. The journal includes metadata transactions upon a plurality of files of a plurality of file systems.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
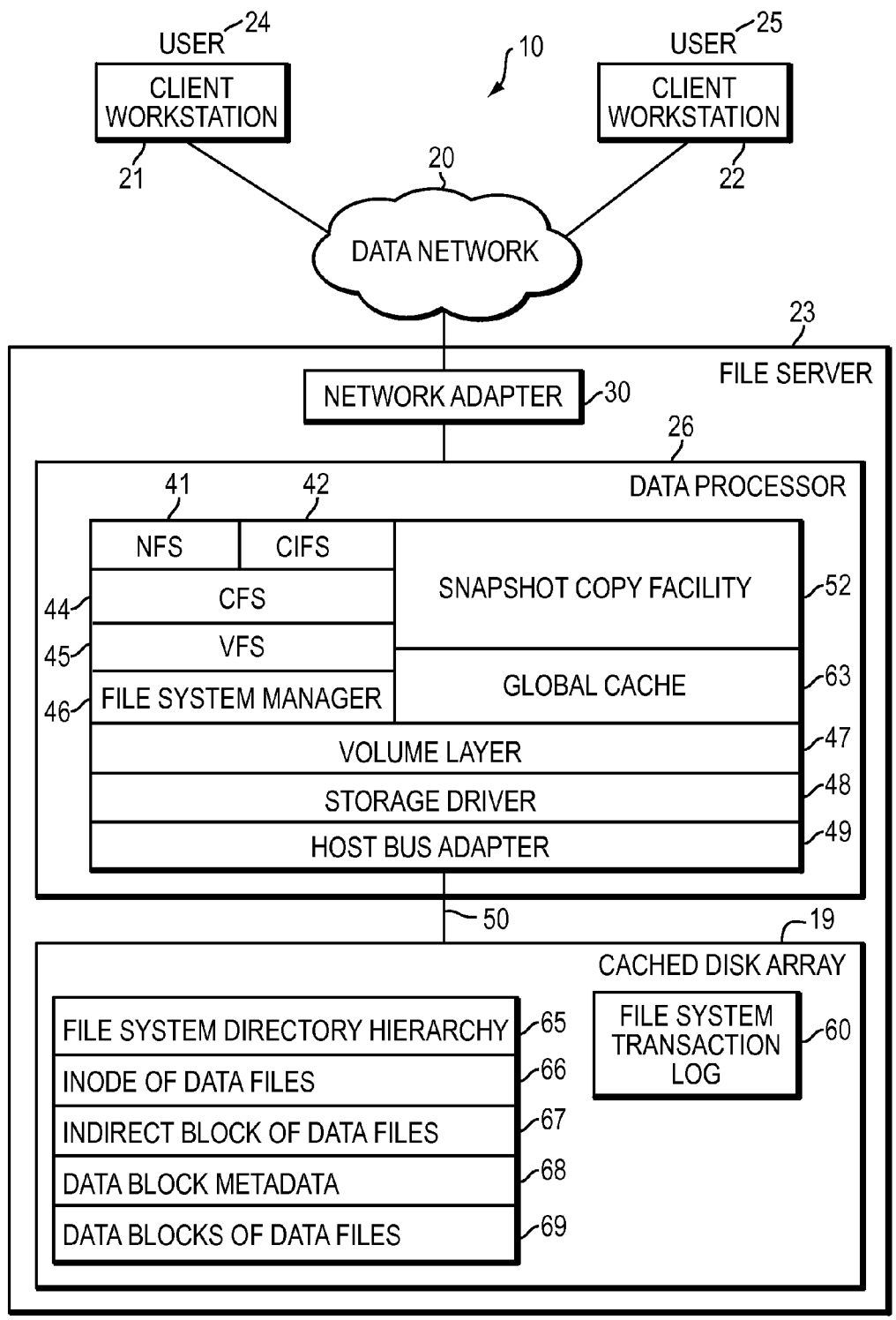
FIG. 1 is an example of an embodiment of a computer system that may utilize the techniques described herein.

Described below is a technique for use in managing files of file systems, which technique may be used to provide, among other things, creating a group transaction record for an indirect data block of a file of a file system, where the indirect data block of the file includes a set of data blocks of the file, adding a set of transaction entries to the group transaction record, where each transaction entry of the set of transaction entries includes information regarding an operation performed on a data block of the set of data blocks, and storing the group transaction record in a journal, where the journal includes metadata transactions upon a plurality of files of a plurality of file systems.

Typically, data and metadata of a file of a file system read from a disk and written to a disk may be cached in a memory such as a system cache of a data storage system. Caching of data and metadata of a file implies that read operations read data and metadata of the file from the memory, rather than from a disk. Correspondingly, write operations may write data and metadata of a file to the memory rather than to a disk. Generally, caching data and metadata of a file of a file system in a memory improves performance of the file system as accessing data from a disk involves an I/O operation to a disk which is slower than accessing data from the memory. Data and metadata of a file cached in the memory is written to the disk at intervals determined by an operating system of the data storage system, which is referred to as flushing of a cache.

A buffer cache pool is created from a portion of a volatile memory of a data storage system where the portion of the volatile memory is apportioned into buffer cache objects (also referred to as "buffer cache page" or "buffer cache block") in such a way that each buffer cache object is represented by a buffer cache descriptor. The buffer cache pool provides buffer cache blocks to applications for storing data and/or metadata of a file system. The buffer cache pool manages allocation, caching and deallocation of buffer cache blocks by adding the buffer cache blocks to any one of queues (or lists) managed by the buffer cache pool. The buffer cache pool caches metadata of a file system which includes directory contents, file status information (e.g., access time, last modification time, size, permission bits), and file system structures (such as indirect blocks, inode, cylinder group blocks and per-block metadata).

Generally, an I/O request is executed by reading data from a persistent storage into a buffer of the buffer cache pool if the data is not already cached and completing the I/O request by performing the I/O operation on the data read into the buffer. A global cache is used to improve I/O performance and decrease read and write I/O latency by caching data and/or metadata of a file in the global cache, logging the changes in a file system transaction log, and flushing (also referred to herein as "committing") the changes to a storage device at a later time.

Typically, an operation such as a file sync writes metadata of a file cached in a memory (e.g., global metadata cache) of a data storage system to a persistent storage at a pre-determined fixed time interval. Further, metadata (e.g., directory blocks, indirect blocks, inode blocks, cylinder group blocks, per-block metadata, slicemap information) of a file of a file system cached in a memory of a data storage system is flushed periodically (such as every 30 seconds) to a persistent storage.

Further, metadata of a file system may be flushed to a persistent storage based on either a specific pre-determined threshold value or in response to a specific condition such as low available memory.

If a file block stored in an in-memory buffer (e.g., a buffer cache block of a buffer cache pool) includes an updated version of metadata compared to on-disk metadata stored in a persistent storage, the in-memory buffer is referred to as a dirty buffer (also referred to herein as "dirty metadata buffer"). Further, contents of the dirty in-memory buffer are flushed by a file sync operation to the persistent storage in order to ensure that a single location on the persistent storage stores the up-to-date metadata for the file block. Typically, a dirty buffer results from an unstable (also referred to as "asynchronous") write operation. Thus, a process of flushing metadata of a file system commits (also referred to as "writes") the metadata from dirty buffers cached in a file system cache to the file system stored on a persistent storage. Further, changes to metadata that are stored in dirty buffers in a memory may include modifications to the inode of a file, any new or modified indirect blocks, modified indirect blocks resulting from deletion of file system blocks, and any modified quota reservations.

Further, a file system is associated with a dirty list that refers to metadata such as cylinder group block entries that have been written to a file system transaction log for the file system but metadata stored on a persistent storage (e.g., disk) have not been updated. Further, a metadata entry is added to a dirty list of a file system when the metadata entry is written to a file system transaction log. Further, metadata information stored in an entry of a dirty list is transferred (also referred to as "flushed") to a persistent storage either by a file sync operation at the time data and/or metadata of a file system is updated or at a later time when a number of entries in the dirty list exceeds a pre-determined threshold.

Generally, a storage system includes a file system transaction log that stores metadata transactions for a file system organized on the storage system. In such a system, when a sync process flushes a dirty metadata of a file of a file system to on-disk representation of the metadata of the file, a corresponding metadata transaction entry stored on a file system transaction log associated with the dirty metadata is marked as finished and becomes available as a free transaction entry. A file system transaction log may be a global journal that may store metadata transactions for each file system of a data storage system. Further, a file system transaction log may be associated with a specific file system.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Typically, a file delete operation deletes a file of a file system in a storage system. When a file is deleted, each file system block of the file is deleted and marked as a free file system block. When a file system block is deleted, a parent file system block which includes a mapping pointer pointing to the file system block is updated to indicate that the mapping pointer no longer points to the file system block. By updating the mapping pointer in such a way creates a hole such that the mapping pointer is marked as unused indicating that the mapping pointer no longer points to any file system block. Thus, upon receiving a request to delete a file, a file system hierarchy of the file is iterated to free each file system block of the file system hierarchy of the file. An indirect block at the lowest level of a file system hierarchy of a file is known as a leaf indirect block. Each leaf indirect block of the file system hierarchy of a file is processed for deleting data blocks pointed to by each leaf indirect block.

Further, a mapping pointer of a file system block includes metadata information for the file system block such as a weight that indicates a delegated reference count for the mapping pointer. The delegated reference count for a file system block is used to determine sharing status of the file system block. For example, a file system block may be shared by a file and a replica or snapshot copy of the file. The delegated reference counting mechanism is described in U.S. Pat. No. 8,032,498 for "Delegated reference count base file versioning" issued Oct. 4, 2011, which is incorporated herein by reference.

Thus, a delegated reference count is a way of maintaining block ownership information for indicating whether or not each indirect block or data block of a file is shared with another version of the file. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block. Further, a file system block is deleted based on the ownership status of the file system block. Thus, a delete operation on a shared file system block decrements the reference count in the per-block metadata of a child block by a full weight or a partial weight depending on whether or not the deleted file system block did not share the child block or did share the child block.

Further, if a file system block is not shared but owned by a parent file system block which points to the file system block, the owned file system block is deleted by freeing the file system block. Further, when a file system block of a file of a file system is deleted, metadata such as superblock of the file, the size of the file, and a parent file system block pointing to the file system block is updated to indicate that the file system block is a free file system block which may be reused. Further, after updating metadata of a file system block of a file upon receiving a request to delete the file, a metadata transaction entry is created and stored in a journal such as a file system transaction log. Further, when a shared file system block is deleted by returning a weight for the shared file system block, a metadata transaction entry created in such a case indicates a return weight transaction. Moreover, when a file system block owned by a parent file system block is deleted by freeing the file system block, a metadata transaction entry created in such a case indicates a free block transaction.

Conventionally, a file delete operation to delete a file traverses the entire file system block hierarchy of the file in order to delete each data block of the file and creates a metadata transaction entry for each data block deleted by the file delete operation. In such a conventional system, if a delete operation is performed on a large file, for example, a file with the size of 100 gigabytes (GB), the delete operation may take a large amount of time such as minutes to delete the file because the delete operation traverses the entire file system block hierarchy of the file to delete each data block of the file and creates a metadata transaction entry for each data block and stores the metadata transaction entry in a file system transaction log. Further, in such a conventional system, evaluation performed on each data block of a file to determine whether a data block is shared or owned so that appropriate metadata transaction may be created and stored in a file system transaction log requires a significant amount of time in case the file includes a large file system block hierarchy.

Generally, a file system transaction log stores a fixed number of metadata transaction entries and each metadata transaction entry stored in the file system transaction log includes a fixed number of sub-transactions. Further, for example, if the size of a metadata transaction entry is 64 kilobytes, up to 82 sub-transactions may fit into one metadata transaction entry based on the size of each sub-transaction. Conventionally, one sub-transaction is created for a delete operation performed on one file system block. Thus, in a conventional system, one indirect data block which may include up to 1024 data blocks may need to create 13 metadata transaction entries such that sub-transactions for each data block of the indirect data block may be stored in a file system transaction log.

Typically, a file system transaction log is circular in nature such that if the file system transaction log becomes full, additional metadata transactions overwrites existing metadata transaction entries of the file system transaction log. In a conventional system, deleting a large file system block hierarchy of a file causes a file system transaction log to become full in a small amount of time because a separate sub-transaction is created for each file system block of the large file system block hierarchy. Further, in such a conventional system, when a file system transaction log becomes full, a sync process flushes each metadata transaction entry stored on the file system transaction log and updates on-disk metadata of a file. Thus, in such a conventional system, flushing of a file system transaction log consumes a large amount of system resources because a large amount of on-disk metadata is updated. Consequently, in such a conventional system, deleting a large file system hierarchy of a file results into generation of a large number of metadata transactions in a file system transaction log which generates significantly high number of I/O requests (e.g., I/O requests for flushing metadata transaction entries of a file system transaction log, I/O requests for reading on-disk metadata associated with each file system block). Thus, in such a conventional system, a large amount of system resources such as a system cache and a memory are consumed for deleting a file.

Conventionally, a single process (also referred to herein as a "thread") process entire file system hierarchy of a file for deleting the file. Consequently, in such a conventional system, the process of deleting a file which includes a large number of data blocks consumes a large amount of system resources and requires a large amount of time to delete the file because one thread iterates over each file system block of the large file system hierarchy of the file. Further, in such a conventional system, when a file system block of a file is freed, the file system block is removed from an extent cache associated with the file. In such a conventional system, removing a file system block from an extent cache requires iterating entire extent cache starting from the first entry of the extent cache thereby consuming a large amount of time to remove the file system block from the extent cache. Further, in such a conventional system, when a file system block is freed, a parent file system block which points to the file system block is updated by copying contents of the parent file system block to a committed copy in a memory thereby consuming system resources such as CPU processing and CPU time. Further, in such a conventional system, updating a parent file system block of each file system block freed as a result of a delete operation performed on a file generates a large number of I/O requests to a storage device in order to modify the parent file system block of each file system block.

By contrast, in at least some implementations in accordance with the current technique as described herein, a file delete operation using the current technique minimizes consumption of system resources and reduces the number of metadata transactions stored in a file system transaction log by creating a bulk sub-transaction that stores multiple sub-transactions and by updating contents of an intermediate indirect data block only when each data block pointed to by a leaf indirect data block has been freed. Thus, in at least one embodiment of the current technique, when a file is deleted using the current technique, the number of operations performed for processing an intermediate indirect data block of a file system hierarchy of the file is significantly reduced. Further, in at least one embodiment of the current technique, creating a bulk sub-transaction reduces the number of metadata transaction entries stored in a file system transaction log for a leaf indirect block because the bulk sub-transaction stores a set of sub-transactions, each sub-transaction of the set of sub-transactions storing information for deleting a file system block. Thus, using the current technique, for example, one bulk sub-transaction may store sub-transactions for every data block of a leaf indirect data block. Thus, in at least one embodiment of the current technique, multiple sub-transactions are compacted into a single bulk sub-transaction thereby efficiently using storage space of a file system transaction log.

Further, when a data block pointed to by a leaf indirect block is processed and freed, a hole is created in the leaf indirect block at the location that points to the data block thereby generating a metadata transaction for updating contents of the leaf indirect block. In at least one embodiment of the current technique, a single bulk sub-transaction may store multiple metadata transaction entries (e.g. up to 82) associated with modification of a leaf indirect block instead of creating a separate sub-transaction for each modification of the leaf indirect block as done in a conventional system. Thus, for example, if a leaf indirect data block includes 1024 data blocks thereby requiring 1024 updates to the leaf indirect block, up to 13 metadata transaction entries, each metadata transaction entry represented by a bulk sub-transaction entry are created by using the current technique and stored in a file system transaction log instead of 1024 metadata transaction entries as generated by using a conventional technique.

Further, in at least one embodiment of the current technique, a bulk sub-transaction also includes metadata information such as a bitmap which enables a file delete operation to efficiently determine sharing status of a file system block and the type of operation performed on the file system block. Further, in at least one embodiment of the current technique, the number of operations performed to create a copy of metadata of a file system block in a memory are reduced by eliminating operations to copy contents of a writeable buffer in a global indirect block cache.

Further, in at least one embodiment of the current technique, a set of processes (also referred to herein as "a thread") perform a file delete operation on a file such that a separate thread is started for processing each leaf indirect block of the file and the set of threads processes leaf indirect blocks of the file concurrently. Further, in at least one embodiment of the current technique, a set of background threads are started to pre-fetch metadata of file system blocks of a set of leaf indirect blocks of a file before another set of threads processes the set of leaf indirect blocks for deleting the file system blocks pointed to by the set of leaf indirect blocks such that the other set of threads uses the metadata information read by the set of background threads to free the file system blocks thereby reducing the amount of time required to delete the file. Further, in at least one embodiment of the current technique, a configuration parameter may indicate how many indirect data blocks may be processed concurrently by a set of threads.

Generally, when an indirect data block is modified as a result of freeing a data block pointed to by the indirect data block, the in-memory copy of the indirect block indicated by a buffer cache entry is modified, a file system transaction entry is created and the buffer cache entry is added as a dirty buffer to a dirty buffers list such that contents of the dirty buffer may be flushed to a storage device at a later time.

In at least one embodiment of the current technique, when data blocks of a leaf indirect data block are freed resulting into modification of a parent indirect block pointing to the leaf indirect block, the parent indirect block is removed from a dirty buffers list and not flushed to a storage device because the leaf indirect block has been marked as a free file system block thus eliminating the need to update on-disk contents of the leaf indirect block thereby reducing the number of I/O operations performed to complete a file delete operation. Further, in at least one embodiment of the current technique, a file delete operation may be throttled dynamically based on a load on a storage system by updating the number of threads that may be executed concurrently for processing indirect data blocks of a file system hierarchy of a file.

In at least some implementations in accordance with the technique as described herein, the use of the managing files of file systems technique can provide one or more of the following advantages: providing effective use of storage space of a file system transaction log by reducing the number of metadata transaction entries stored in the file system transaction log, and improving I/O performance by efficiently managing deletion of files of a file system and effectively flushing file system transaction entries of a file system transaction log.

It should be noted that within this document the term "I/O request" may be used interchangeably with the term "I/O operation" to represent an I/O operation performed on a file system.

Referring now to FIG. 1, shown is an example of an embodiment of a computer system such as a data storage system that may be used in connection with performing the technique or techniques described herein. The data storage system 10 includes a data network 20 interconnecting clients 21, 22 and a data storage system such as a network file server 23 (also referred to simply as "file server"). The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 1, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 20 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Figure 2:
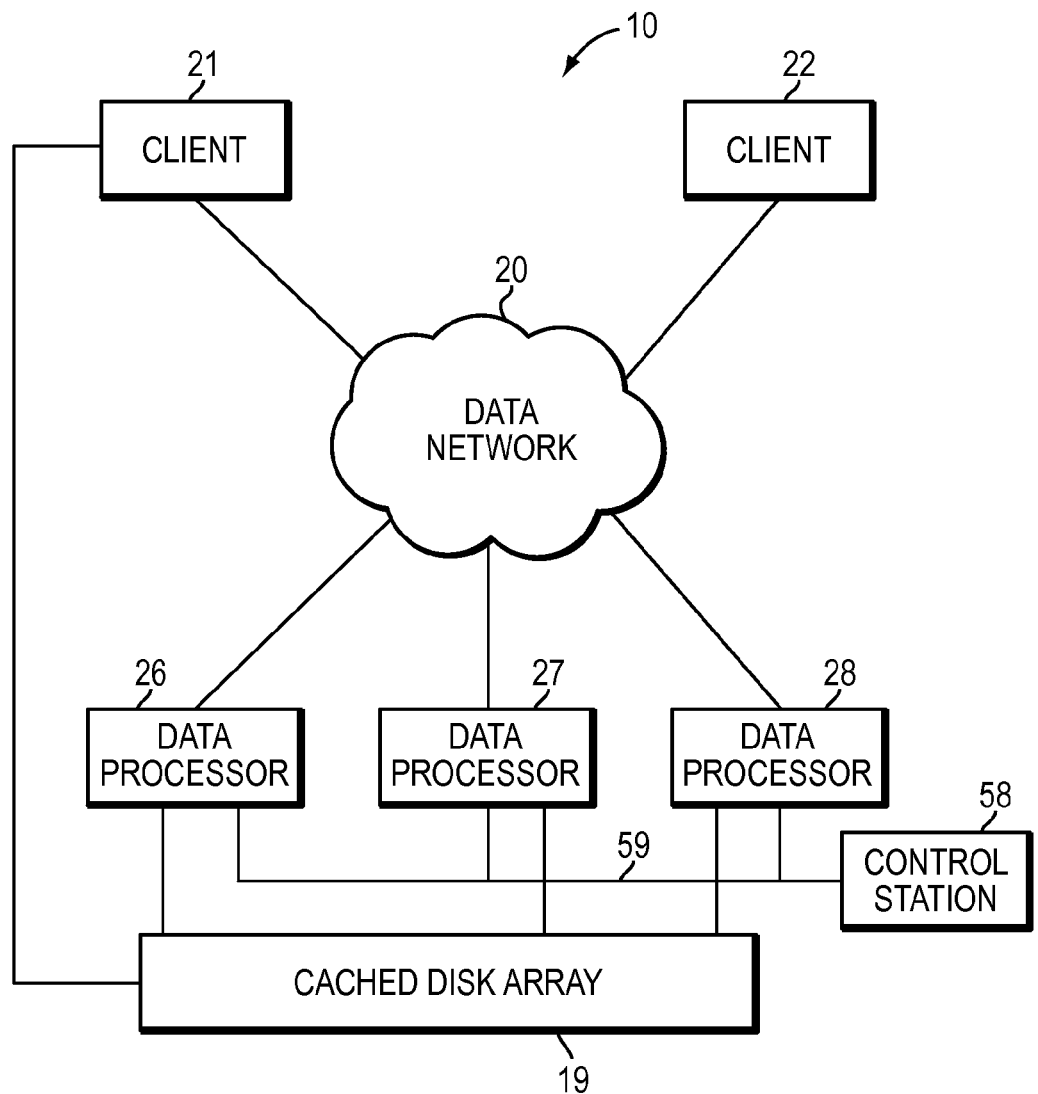
FIG. 2 is an example of an embodiment of a computer system that may utilize the techniques described herein.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 1, a file system stored on a storage device is organized as a hierarchy (also referred to herein as "file system hierarchy"). At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. Further, global cache 63 stores metadata of a file of a file system in a volatile memory of data storage system 10.

In at least one embodiment of the current technique, a global cache may store data and/or metadata of a file of a file system in a volatile memory of data storage system 10. Further, a global cache may be initialized at the time file server 23 is initialized. A global cache may be created in a volatile (e.g., Direct Random Access Memory (DRAM) of file server 23. Further, a global cache may also be created in a nonvolatile memory of file server 23. Further, in at least one embodiment of the current technique, a nonvolatile memory may include a flash memory (e.g. solid state drives, EEPROM (electrically erasable programmable read-only memory)). Further, it should be noted that a global cache may include a global data cache and a global metadata cache. Further, a global cache may cache both data and metadata of a file system.

Referring now to FIG. 2, shown is the network file server 23 of FIG. 1 that may further include a control station 58 and additional data processors (such as data processors 27, 28) sharing the cached disk array 19. A dual-redundant data link 59 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 3:
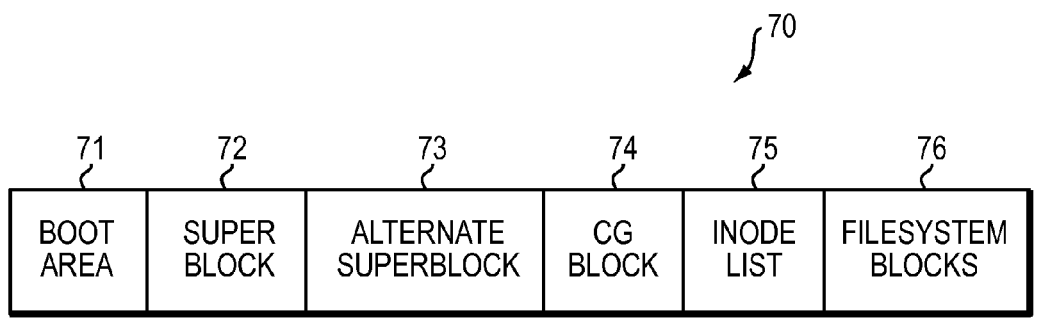
FIGS. 3-7 are diagrams illustrating in more detail components that may be used in connection with techniques herein.

Referring to FIG. 3, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 4:
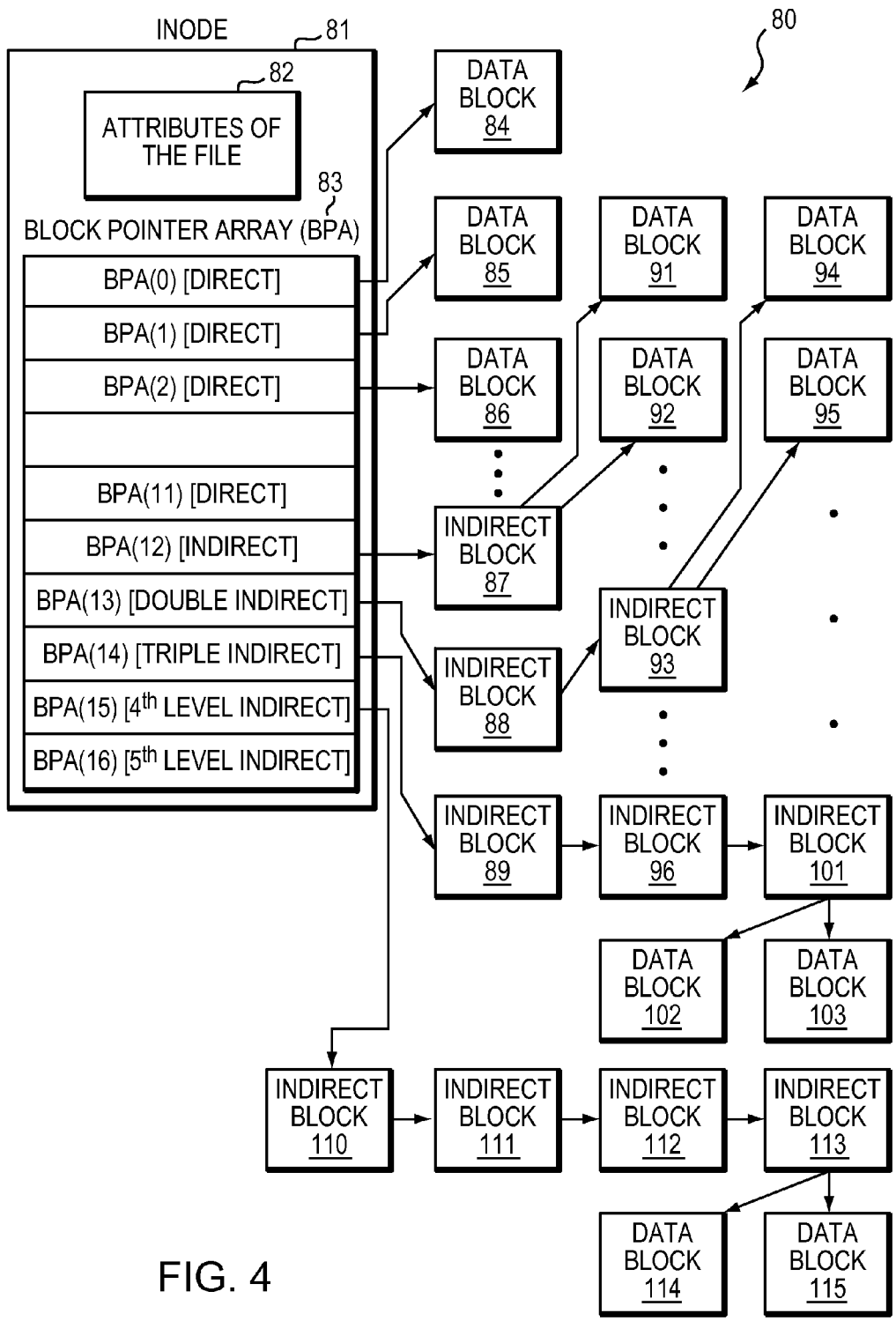

Referring to FIG. 4, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks (e.g., 102, 103). Similarly the file may include fourth (BPA(15)) and fifth (BPA(16)) level of indirections indicated by indirect blocks 110-113 and data blocks 114-115.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log offers increased reliability, because the file system transaction log may replicate some or all of the file systems metadata which can be applied to the file systems at a later time in order to make the file systems metadata consistent with changes applied to data of the file systems. However, frequent and recurring updates to the file systems may fill up the file system transaction log.

Typically, a file system transaction log only stores changes to metadata (such as inodes, directories, allocation maps) of file systems of a data storage system. If file server 23 shuts down without a failure, the file system transaction log can be discarded, because file systems stored on a persistent storage in such a case is consistent and includes all metadata changes stored in the file system transaction log. However, when file server 23 shuts down due to a failure, the file system transaction log is used to rebuild the file systems in order to restore the file systems to a consistent state. Generally, all operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering a file system to a consistent state by applying metadata changes stored in the file system transaction log to a persistent storage is known as "replay of a file system transaction log".

File system operations such as "setattr", "write", "link", "symlink", "create", "remove", "mkdir", "rmdir", "delete" and "rename" result in changes to metadata of a file system because these operations modify the file system. Each of these file system operations results in changes to metadata. Further, file operations such as "delete file" also result in changes to metadata of a file because these operations modify the file.

Figure 5:
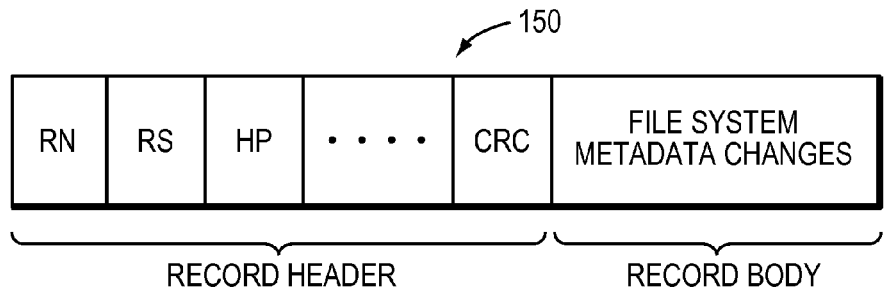

Referring to FIG. 5, shown is a logical representation of a log entry (also referred to as a "transaction record" or "metadata transaction") of a file system transaction log that may be included in an embodiment using the techniques described herein. With reference also to FIG. 1, the file system transaction log 60 includes a set of log entries where each log entry includes changes to metadata associated with a file system operation (e.g. a NFS request) sent by a client connected to file server 23. A log entry 150 includes a record header and a record body. The record body of log entry 150 contains changes to metadata of a file system resulting from a transaction including a file system operation performed on the file system. The record header of log entry 150 includes a record number (RN), a record size (RS), a head pointer (HP), and a number of additional fields. The last field of the header is a cyclic redundancy check (CRC). The CRC, for example, is a thirty-two bit CRC known as "CRC32" computed by calling an operating system utility routine.

Figure 6:
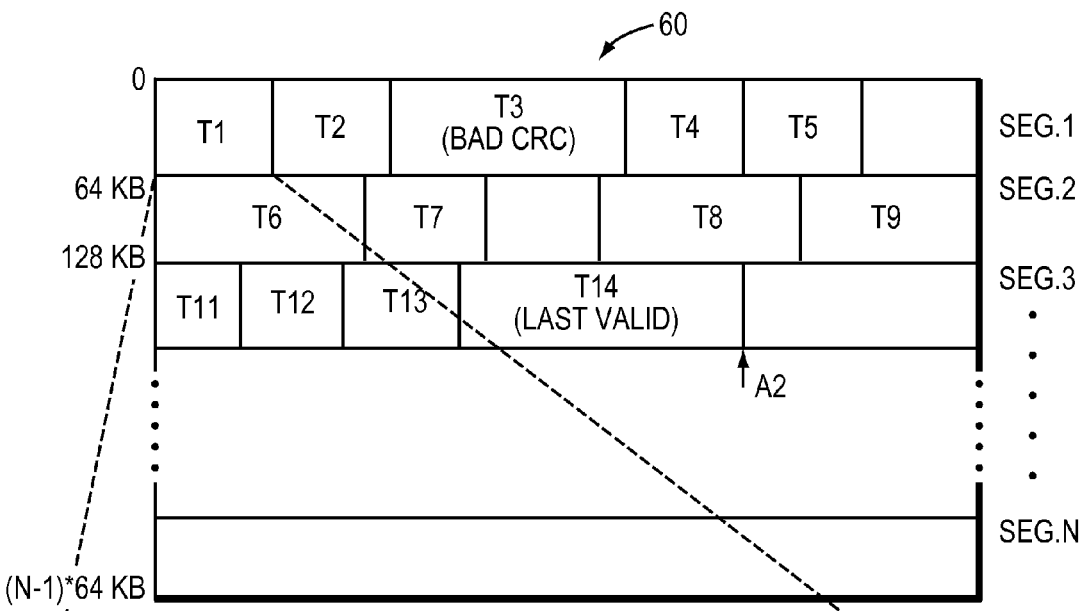

Referring to FIG. 6, shown is a logical representation of a file system transaction log that may be included in an embodiment using the techniques described herein. The file system transaction log 60 may be organized as a series of 64 kilobytes (KB) segments. A series of transactions T1 to T14 are shown in the file system transaction log 60. Within a buffer, the transactions are collected into segments of 64 KB so that no transaction crosses a segment boundary. For example, in at least one embodiment of the current technique, each transaction is rounded up to a multiple of 512 byte blocks because each 512 byte block are atomically written to a disk storage. Recovering the file system transaction log 60 includes replaying each log entry of the file system transaction log 60 starting from the first log entry to the last entry of the log 60, and flushing metadata changes stored in each log entry to respective metadata objects on a disk.

Further, the file system transaction log 60 is organized as a sequential log where new entries are added in a sequential manner. Further, the first entry of the file system transaction log 60 is referred to as the head and the last used entry of the file system transaction log 60 is referred to as the tail. Further, the file system transaction log 60 is maintained in a circular manner in such a way that a new entry is added at the tail and when the tail reaches the end of the fixed size file system transaction log 60, a new entry overwrites an entry that resides at the head of the file system transaction log 60.

Thus, in at least one embodiment of the current technique, a new metadata transaction is stored by adding a new log entry in the file system transaction log 60 of data storage system 10. The new log entry includes information regarding changes to metadata associated with an operation (e.g. write I/O request, freeing of a data block, releasing weight of a shared data block, deleting a file) directed to a file of a file system. The metadata transaction represented by the new log entry is considered unfinished because no updates have been applied to metadata of the file stored on a storage device at the time the transaction is considered unfinished. Further, to mark the transaction as unfinished, a log hold is acquired on the new log entry. A log hold represents a reference taken on a log entry such that the log entry indicates the current position of the file system transaction log 60 indicating that the log entry is the first transaction to be replayed when file server 23 reboots or restarts due to a failure. Thus, if file server 23 restarts or reboots due to a failure, the new log entry that has been marked as an unfinished transaction is replayed to update metadata of the file stored on storage device 215 in order to ensure consistency of the file. Further, a metadata transaction for a file represented by a log entry is considered finished when updates have been applied to metadata of the file stored on a storage device.

Thus, if file server 23 reboots or restarts after encountering a failure, log entries of the file system transaction log 60 are replayed to ensure that metadata changes stored in the file system transaction log 60 are consistent with metadata of file systems stored a storage device. The file system transaction log 60 is replayed from its current position indicating the last valid log entry of the file system transaction log 60. A record pointer is set to point to the last valid record of file system transaction log 60. A log entry pointed to by the record is read from the file system transaction log 60. Information stored in the log entry is applied to metadata of a file stored on a storage device 215. Next, a determination is made whether the record is the last valid record of the file system transaction log 60. If the record is the last valid record, the process of replaying of the file system transaction log 60 ends. If the record is not the last valid record of the file system transaction log 60, the record pointer is incremented to point to the next valid record in the file system transaction log.

In at least one embodiment of the current technique, file server 23 includes global metadata caches such as a global cylinder group buffers cache, a global inode buffers cache, a global indirect block cache for storing metadata such as indirect block entries. Further, a global metadata cache may be organized as a set of hash buckets such that each bucket of the set of hash buckets includes one or more cache entries that are accessed by a hash key.

In at least one embodiment of the current technique, each file system of file server 23 includes a dirty list of metadata such as indirect block buffer cache entries, cylinder group buffers, and inode buffers that have been written to the file system transaction log 60 but updates have not been made to metadata of a file system stored on a disk. Further, metadata entry on a dirty list for a file system points to a cache entry residing on a global metadata cache.

Figure 7:
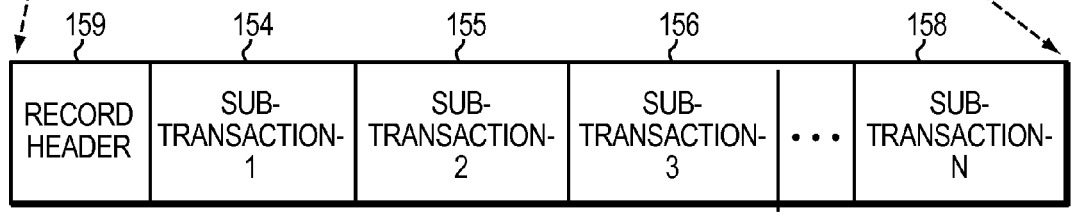

Referring to FIG. 7, shown is a detailed representation of components that may be included in an embodiment using the techniques described herein. Generally, each transaction of a file system transaction log includes a record header 159, and a set of sub-transactions (e.g. 154, 155, 156, 158). A size of a transaction may be, for example, 64 kilobytes (KB) as described in FIG. 6. Further, based on the sizes of transaction and sub-transaction, a transaction may store a fixed number of sub-transactions. Thus, for example, a transaction of size 64 kilobytes (KB) may store up to 82 sub-transactions. However, it should be noted that other sizes for transaction and sub-transaction may be used as well in a storage system.

Figure 8:
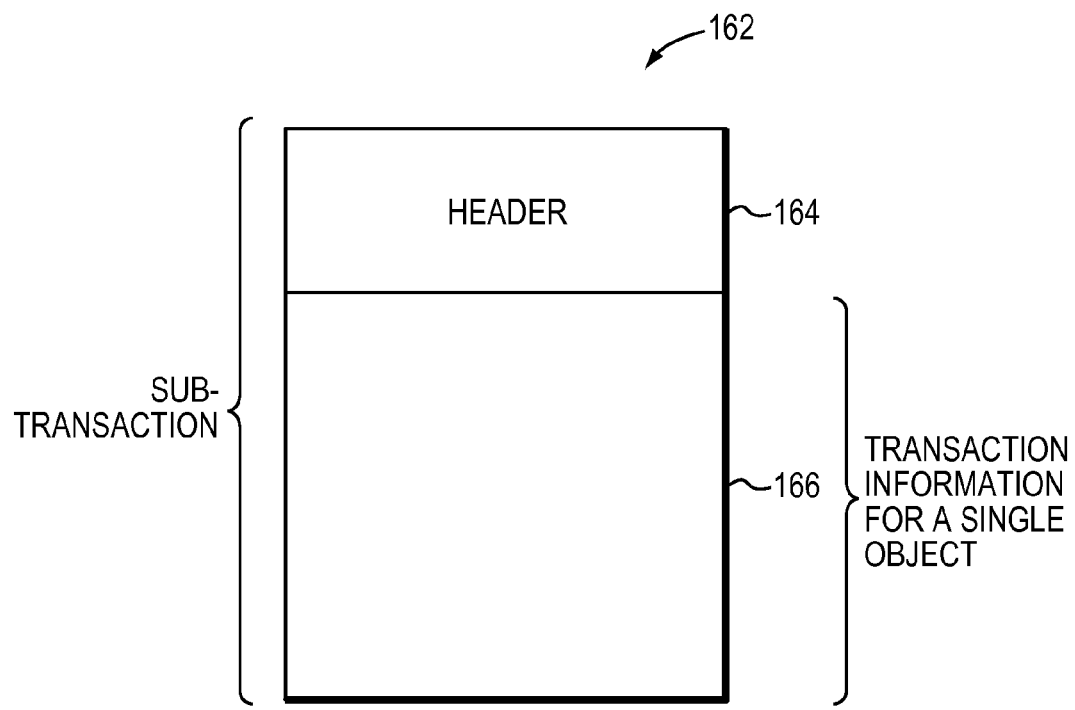
FIG. 8 is a diagram illustrating in detail components that are used in a conventional system.

Referring to FIG. 8, shown is a representation of a conventional sub-transaction included in a transaction entry of a file system transaction log in a conventional system. Conventionally, a sub-transaction is created for an operation such as a delete operation performed on a file system block. In such a conventional system, a sub-transaction 162 includes a fixed sized header 164 and information 166 regarding an operation performed on a file system block of a file. Thus, in such a conventional system, if a file system block is owned by a parent file system block (e.g., an indirect data block), information 166 includes a free block transaction indicating that the file system block has been deleted and marked as a free file system block. Further, in such a conventional system, if a file system block is shared by two or more file system blocks (e.g., indirect data blocks), information 166 includes a return weight transaction indicating that the weight of the file system block is updated to free the file system block. Thus, in a conventional system, a file system transaction log may fill up in a short amount of time before every file system block of a file may be processed for deletion because a separate sub-transaction is created for each file system block of the file.

Further, in such a conventional system, creating and storing a sub-transaction in a file system transaction log for a metadata changes in a file system block includes writing a header. Thus, in such a conventional system, processing of file system block of a large file system hierarchy of a file writes a large number of headers to a file system transaction log stored on a storage device thereby causing additional I/O operations to the storage device.

Figure 9:
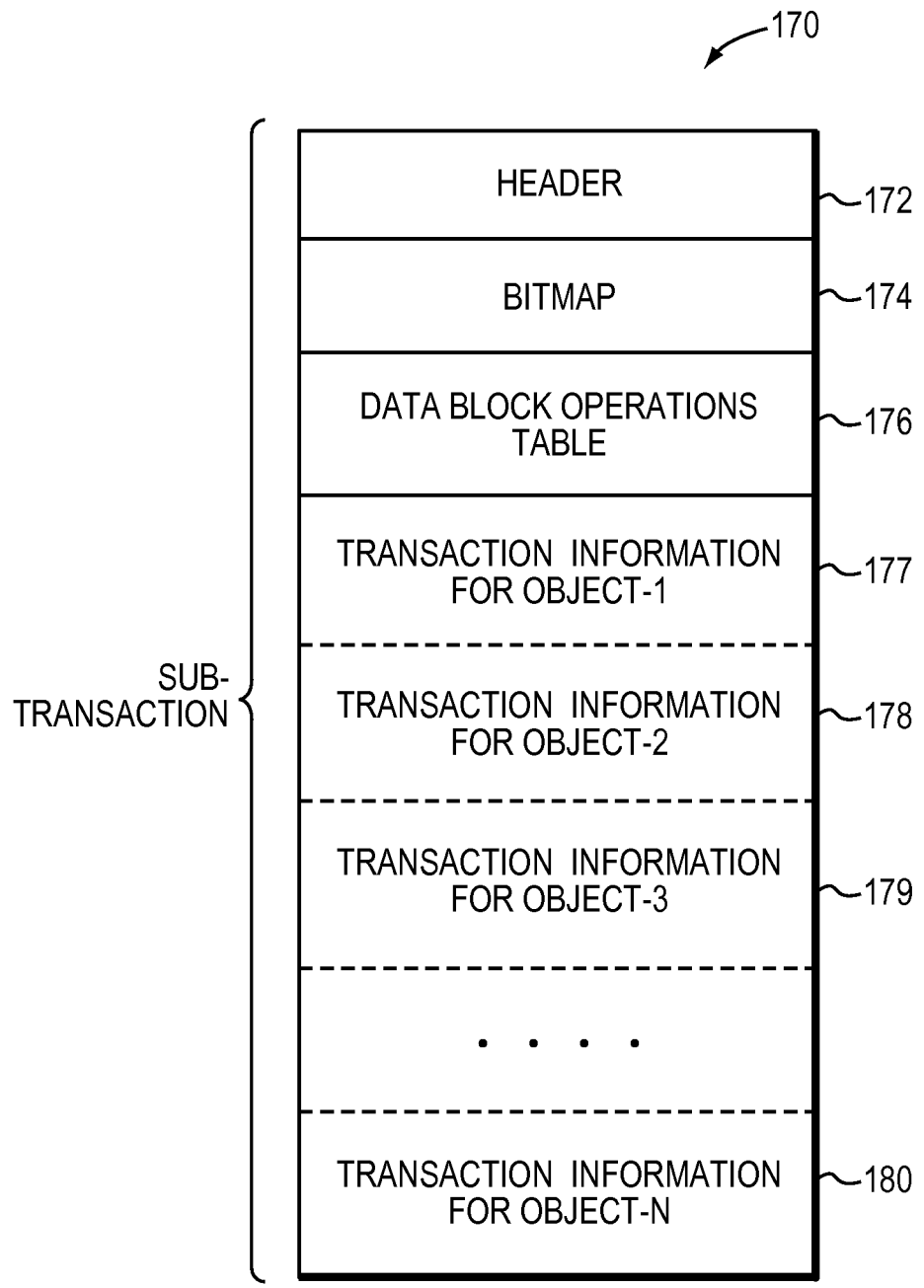
FIG. 9 is a diagram illustrating in more detail components that may be used in connection with techniques herein.

Referring to FIG. 9, shown is a detailed representation of components that may be included in an embodiment using the techniques described herein. In at least one embodiment of the current technique, a bulk sub-transaction 170 is created when a file delete operation for a file starts processing a leaf indirect block of a file system hierarchy of the file. A bulk sub-transaction 170 includes a set of entries 177, 178, 179, 180 such that each entry stores metadata transaction information regarding an operation (e.g., free block, return weight) performed on a file system block. Further, a bulk sub-transaction 170 includes a fixed sized header 172, bitmap 174 and data block operations table 176.

Thus, in at least one embodiment of the current technique, instead of creating a sub-transaction for each metadata transaction upon a file system block as in a conventional system, the current technique creates a bulk sub-transaction and attempts to include as many sub-transactions as possible in the bulk sub-transaction based on the size of each sub-transaction. Further, a bulk sub-transaction is written to a file system transaction log after a set of metadata transactions for a set of file system blocks are added to the bulk sub-transaction. Thus, for example, a metadata transaction for each data block pointed to by a leaf indirect block may be included in one single bulk sub-transaction.

Further, in at least one embodiment of the current technique, a bulk sub-transaction 170 includes a single header for a set of metadata transactions 177-180. Thus, instead of writing a header for each metadata transaction for a file system block as done in a conventional system, the current technique writes one header for a set of metadata transactions for a set of file system blocks included in a bulk sub-transaction thereby reducing the number of I/O operations to a storage device and efficiently using memory and storage resources of a storage system.

In at least one embodiment of the current technique, a bitmap 174 includes information regarding file system blocks of a file system hierarchy of a file. Further, the bitmap 174 includes a set of entries for a set of file system blocks of a leaf indirect block for which the bulk sub-transaction 170 is created such that each entry of the set of entries includes at least two bits which store information regarding a file system block of the set of file system blocks. The first bit in an entry of bitmap 174 describes which file system block of a leaf indirect block has been updated as a result of an operation (e.g., free file system block). Thus, the first bit in an entry of bitmap 174 may describe whether an operation has been performed on a file system block. The second bit in an entry of bitmap 174 describes what type of operation has been performed on a file system block. For example, the operation performed on a file system block may be a free block operation in case the file system block is owned or a return weight operation in case the file system block is shared. The bitmap 174 is stored and updated in a volatile memory of a storage system. However, the bitmap 174 is also stored as part of a bulk sub-transaction and stored in a file system transaction log organized on a storage device. Further, a bulk sub-transaction includes a data block operations table 176 indicating the type of an operation performed on a file system block of a file.

Thus, in at least one embodiment of the current technique, each transaction entry 177-180 included in a bulk sub-transaction is associated with a file system block of a file and stores information regarding operation performed on the file system block. Further, an operation performed on a file system block may be a free block operation or a return weight operation. If bitmap 174 of a bulk sub-transaction 170 for a leaf indirect data block indicates that the indirect data block points to a data block at a specific location and the data block has been processed for performing an operation on the data block, a metadata transaction entry (also referred to herein as "sub-transaction") is created for the data block and added to the bulk sub-transaction 170.

Further, if a bulk sub-transaction for a leaf indirect data block is unable to store transaction entries corresponding to each data block pointed to by the leaf indirect data block, a new bulk sub-transaction is created to store rest of the data blocks pointed to by the leaf indirect block.

Further, when an operation (e.g., a free block operation, a return weight operation) is performed on a file system block, appropriate metadata stored in a memory is updated and a metadata transaction is created and stored in a file system transaction log. The metadata transaction in such a case is marked as a completed transaction once updates have been applied to metadata for the file system block. Further, when a metadata transaction associated with a file system block is marked as a completed transaction, a parent file system block pointing to the file system block is updated to indicate the operation performed on the file system block.

Conventionally, each file system block is associated with a separate metadata sub-transaction stored as a separate metadata transaction entry in a file system transaction log and upon completion of each metadata sub-transaction, a parent file system block (e.g. an indirect data block) is modified thereby generating additional metadata transactions.

By contrast, in at least one embodiment of the current technique, multiple metadata sub-transactions are included in a single bulk sub-transaction and upon completion of the bulk sub-transaction, a parent file system block is updated thereby reducing the number of metadata transactions stored in a file system transaction log, reducing consumption of storage and memory resources, reducing the number of I/O operations performed on a storage device in order to update on-disk metadata, and efficiently using the storage space of the file system transaction log.

Figure 10:
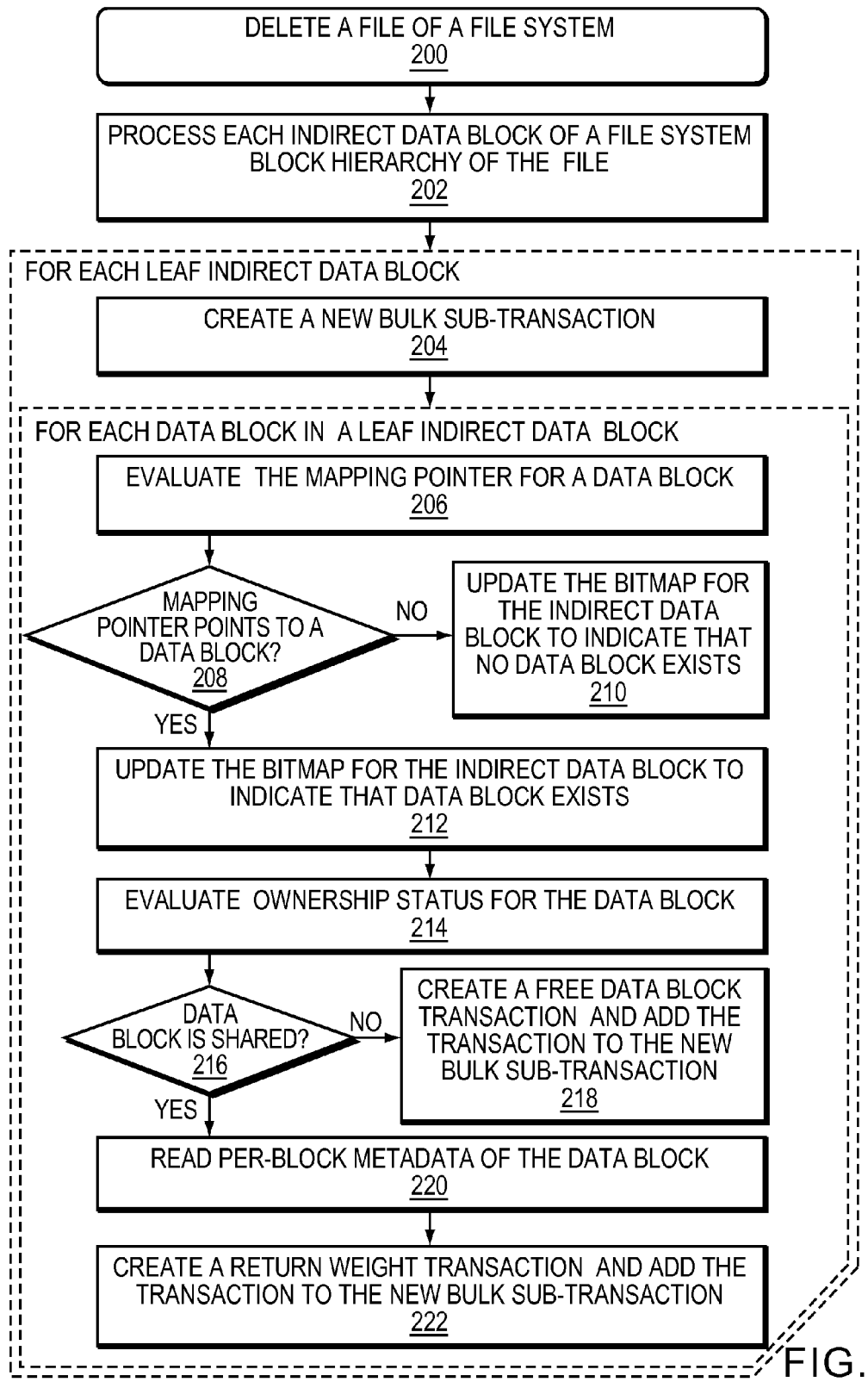
FIGS. 10-12 are flow diagrams illustrating processes that may be used in connection with techniques herein.

Referring to FIG. 10, shown is a flow diagram illustrating a flow of data in the data storage system. With references also to FIGS. 4-7 and 9, in at least one embodiment of the current technique, a data storage system receives a request to delete a file (step 200). Each indirect data block of a file system hierarchy of the file is processed for deleting data blocks pointed to by each indirect data block (step 202). For each leaf indirect data block, a new bulk sub-transaction is created which is stored in a file system transaction log as a single metadata transaction (step 204). An indirect data block includes a set of mapping pointers, each mapping pointer pointing to a data block. For example, an indirect data block may include up to 1024 data blocks. In order to process a leaf indirect data block, each mapping pointer of the leaf indirect data block which points to a data block is evaluated (step 206). A determination is made as to whether the mapping pointer points to a valid data block (step 208). Upon determining that the mapping pointer does not point to a data block indicating a hole at the location indicated by the mapping pointer, bitmap 174 for the leaf indirect block is updated (step 210). In such a case, the first bit of an entry in the bitmap 174 for the leaf indirect block associated with the mapping pointer is set to a value (e.g. 0) which indicates that the mapping pointer does not point to any data block and a hole exists at the location indicated by the mapping pointer. Thus, processing for the mapping pointer pointing to a hole is skipped and the next mapping pointer of the leaf indirect block is evaluated at step 206.

However, if the mapping pointer points to a data block, bitmap 174 for the leaf indirect block is modified by updating the first bit of an entry associated with the mapping pointer in the bitmap 174 with a value (e.g. 1) which indicates that the mapping pointer points to a data block (step 212). Updating the first bit of an entry associated with a mapping pointer of an indirect block with an appropriate value indicates that the mapping pointer does not need to be processed again for determining whether a data block exists at that location. Further, upon determining that a data block is pointed to by the mapping pointer, ownership status of the data block is evaluated by using the information (e.g., shared bit) stored in the mapping pointer (step 214). A determination is made as to whether the data block is shared by two or more indirect data blocks (step 216). Upon determining that the data block is not shared but owned by the leaf indirect block, the data block is marked as a free block, the mapping pointer is updated to indicate that the data block has been freed, a free block transaction is created and added to the bulk sub-transaction, and the second bit of an entry associated with the mapping pointer in bitmap 174 is set to a value (e.g., 1) indicating that the free block transaction has been created for the data block (step 218).

However, upon determining that that data block is shared by at least two indirect data blocks, per-block metadata of the data block is read from a storage device in order to determine whether the data block is actually shared (step 220). The mapping pointer for a data block may include status indicating that the data block is shared in case the data block is not referred to by any other indirect data block indicating a false sharing which occurs when every indirect data block but one indirect data block sharing the data block releases the reference to the shared data bock. Thus, in order to determine whether a data block is actually shared by two or more indirect data blocks, per-block metadata of the data block is read. If the per-block metadata of the data block indicates that the data block is owned by the leaf indirect block, the data block is processed as described in the step 218. However, if the per-block metadata of the data block indicates that the data block has been shared among the leaf indirect data block and at least one other indirect data block, the weight for the data block is returned indicating that the leaf indirect data block has released the reference to the data block, the mapping pointer is updated to indicate that the data block has been freed by the leaf indirect data block, a return weight transaction is created and added to the bulk sub-transaction for the leaf indirect data block, and the second bit of an entry associated with the mapping pointer in bitmap 174 is set to a value (e.g., 0) indicating that the return weight transaction has been created for the data block (step 222).

Figure 11:
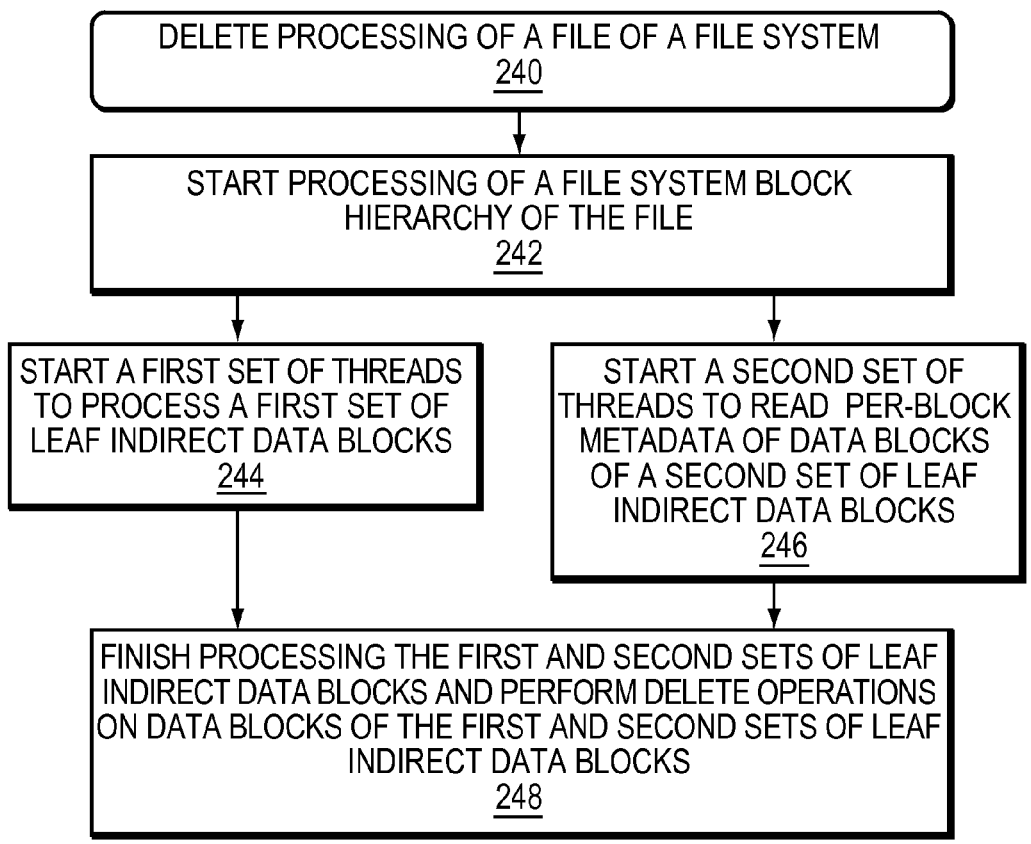

Referring to FIG. 11, shown is a flow diagram illustrating a flow of data in the data storage system. With references also to FIGS. 4-7 and 9, in at least one embodiment of the current technique, a data storage system processes a file of a file system in order to delete the file (step 240). Each indirect data block of a file system hierarchy of the file is processed for deleting data blocks pointed to by each indirect data block (step 242). A parent process is started for processing the file system hierarchy of the file. In at least one embodiment of the current technique, per-block metadata of data blocks targeted for deletion are read ahead of processing the data blocks for deletion such that one set of threads pre-fetches per-block metadata of a set of data blocks and another set of threads processes the set of data blocks by using the per-block metadata read by the first set of threads. Further, when one set of threads starts processing a first set of indirect data blocks, another set of threads may be started to read metadata of data blocks of a second set of indirect data blocks such that when the second set of indirect data blocks are processed for deletion, the metadata of the data blocks of the second set of indirect data blocks is already available to a set of threads which processes the second set of indirect data blocks for deletion.

Thus, in at least one embodiment of the current technique, a first set of threads are started to process a first set of leaf indirect data blocks of the file system hierarchy of the file (step 244). The first set of leaf indirect data blocks are processed in parallel by the first set of threads. A single thread processes one leaf indirect data block. In order to process data blocks of a leaf indirect data block for deleting the data blocks, per-block metadata of the data blocks may need to be evaluated as described above herein in step 220 of FIG. 10. A second set of threads pre-fetches in advance per-block metadata of data blocks processed by the first set of threads and provide information of the per-block metadata to the first set of threads processing those data blocks (step 246). The first set of threads finishes processing data blocks of the set of leaf indirect data blocks by using the information provided by the second set of threads (step 248). The parent thread waits until the first and second set of threads finish processing the first set of leaf indirect data blocks and starts another iteration of the first and second set of threads to process another set of leaf indirect data blocks. Thus, the process as described above herein is repeated until each indirect data block and data block of the file system hierarchy of the file has been processed and deleted.

Figure 12:
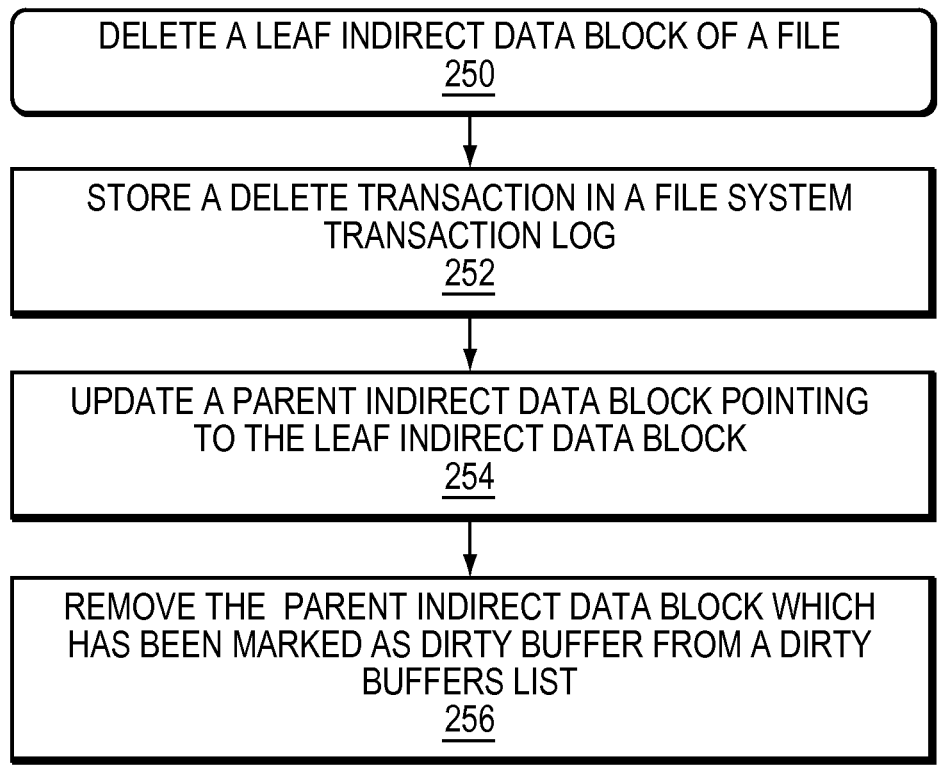

Referring to FIG. 12, shown is a flow diagram illustrating a flow of data in the data storage system. With references also to FIGS. 4-7 and 9, in at least one embodiment of the current technique, a leaf indirect data block of a file is deleted when every data block pointed to by the leaf indirect data block is freed as described above herein in FIG. 10 (step 250). A data block pointed to by a mapping pointer of an indirect data block creates a hole at the location in the indirect data block represented by the mapping pointer. Thus, when every data block pointed to by the leaf indirect data block is freed, the leaf indirect data block is marked as a free file system block as well. When a leaf indirect data block is freed, a delete leaf indirect data block transaction is created and stored in a file system transaction log (step 252). The parent indirect data block pointing to the leaf indirect data block is updated to indicate that the leaf indirect data block has been freed (step 254). Thus, the delete indirect data block transaction is marked as completed and the modified parent indirect data block is added to a dirty buffers list such that modification to the parent indirect data block may be flushed to on-disk metadata stored on a storage device. In at least one embodiment of the current technique, the parent indirect data block is removed from the dirty buffers list in order to avoid a write I/O operations to the storage device because the file is in a process of being deleted and writing intermediate modified parent indirect data block to the storage device may be avoided (step 256).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing files of file systems, the method comprising:
creating a bulk transaction record for an indirect data block of a file of a file system, wherein the indirect data block of the file includes a set of data blocks of the file, wherein the bulk transaction record indicates updates to the indirect data block;
adding a set of transaction entries to the bulk transaction record, wherein each transaction entry of the set of transaction entries includes metadata transaction information regarding an operation performed on a data block of the set of data blocks; and
storing the bulk transaction record in a journal as a single metadata transaction instead of storing separate metadata transactions in the journal for each transaction entry included in the bulk transaction record, wherein the journal includes a persistent log, wherein the journal includes a set of bulk transaction records, each bulk transaction record of the set of bulk transaction records indicating changes to metadata of a plurality of files of a plurality of file systems, wherein the journal is used for recovering the file system by using the changes to the metadata stored in the journal for updating metadata of the plurality of file system organized on a persistent storage.

2. The method of claim 1, wherein the journal includes a persistent record created on a file system.

3. The method of claim 1, wherein the journal includes a persistent file system transaction log, wherein the file system transaction log is associated with a file system and stored on a storage device.

4. The method of claim 1, wherein the journal includes a set of metadata transactions, wherein each metadata transaction of the set of metadata transactions includes a record header and a set of bulk sub-transactions.

5. The method of claim 4, wherein a bulk sub-transaction includes a header, a bitmap, a data block operations table, and a set of transaction entries, wherein each transaction entry of the set of transaction entries includes information regarding change in metadata for a file system block.

6. The method of claim 5, wherein a bitmap included in a bulk sub-transaction includes a set of bitmap entries, wherein each bitmap entry includes at least two bits, wherein a first bit of the at least two bits indicate whether the bitmap entry points to a file system block, wherein a second bit of the at least two bits indicates an operation performed on a file system block associated with the bitmap entry.

7. The method of claim 6, further comprising:
evaluating each mapping pointer of a set of mapping pointers included in the indirect data block of the file, wherein a mapping pointer points to a data block of the indirect data block; and
based on the evaluation, updating the bitmap of a bulk sub-transaction created for the indirect data block of the file.

8. The method of claim 1, wherein a bulk transaction record includes a bulk sub-transaction.

9. The method of claim 1, further comprising:
evaluating an ownership status of a data block of the set of data blocks of the indirect data block of the file; and
based on the ownership status, adding a transaction entry for the data block to the group transaction record.

10. The method of claim 1, wherein a transaction entry of the set of transaction entries includes the type of the transaction entry, wherein the type of a transaction entry includes a free block transaction and a return weight transaction.

11. A system for use in managing files of file systems, the system comprising:
 first logic creating a bulk transaction record for an indirect data block of a file of a file system, wherein the indirect data block of the file includes a set of data blocks of the file, wherein the bulk transaction record indicates updates to the indirect data block;
 second logic adding a set of transaction entries to the bulk transaction record, wherein each transaction entry of the set of transaction entries includes metadata transaction information regarding an operation performed on a data block of the set of data blocks; and
 third logic storing the bulk transaction record in a journal as a single metadata transaction instead of storing separate metadata transactions in the journal for each transaction entry included in the bulk transaction record, wherein the journal includes a persistent log, wherein the journal includes a set of bulk transaction records, each bulk transaction record of the set of bulk transaction records indicating changes to metadata of a plurality of files of a plurality of file systems, wherein the journal is used for recovering the file system by using the changes to the metadata stored in the journal for updating metadata of the plurality of file system organized on a persistent storage.

12. The system of claim 11, wherein the journal includes a persistent record created on a file system.

13. The system of claim 11, wherein the journal includes a persistent file system transaction log, wherein the file system transaction log is associated with a file system and stored on a storage device.

14. The system of claim 11, wherein the journal includes a set of metadata transactions, wherein each metadata transaction of the set of metadata transactions includes a record header and a set of bulk sub-transactions.

15. The system of claim 14, wherein a bulk sub-transaction includes a header, a bitmap, a data block operations table, and a set of transaction entries, wherein each transaction entry of the set of transaction entries includes information regarding change in metadata for a file system block.

16. The system of claim 15, wherein a bitmap included in a bulk sub-transaction includes a set of bitmap entries, wherein each bitmap entry includes at least two bits, wherein a first bit of the at least two bits indicate whether the bitmap entry points to a file system block, wherein a second bit of the at least two bits indicates an operation performed on a file system block associated with the bitmap entry.

17. The system of claim 16, further comprising:
 fourth logic evaluating each mapping pointer of a set of mapping pointers included in the indirect data block of the file, wherein a mapping pointer points to a data block of the indirect data block; and
 fifth logic updating, based on the evaluation, the bitmap of a bulk sub-transaction created for the indirect data block of the file.

18. The system of claim 11, wherein a bulk transaction record includes a bulk sub-transaction.

19. The system of claim 11, further comprising:
 fourth logic evaluating an ownership status of a data block of the set of data blocks of the indirect data block of the file; and
 fifth logic adding, based on the ownership status, a transaction entry for the data block to the bulk transaction record.

20. The system of claim 11, wherein a transaction entry of the set of transaction entries includes the type of the transaction entry, wherein the type of a transaction entry includes a free block transaction and a return weight transaction.

* * * * *